(12) United States Patent
O'Hare et al.

(10) Patent No.: US 12,045,165 B1
(45) Date of Patent: Jul. 23, 2024

(54) DIRECT ADDRESSING AND EFFICIENT STORAGE OF VARIABLE SIZED METADATA

(71) Applicant: Dell Products, L.P., Hopkinton, MA (US)

(72) Inventors: Jeremy O'Hare, Westborough, MA (US); Stephen M. Lathrop, Milford, MA (US); Anoop Raghunathan, Ashland, MA (US)

(73) Assignee: Dell Products L.P., Hopkinton, MA (US)

( * ) Notice: Subject to any disclaimer, the term of this patent is extended or adjusted under 35 U.S.C. 154(b) by 66 days.

(21) Appl. No.: 18/171,457

(22) Filed: Feb. 20, 2023

(51) Int. Cl.
*G06F 12/02* (2006.01)
(52) U.S. Cl.
CPC .... *G06F 12/0284* (2013.01); *G06F 2212/254* (2013.01)
(58) Field of Classification Search
CPC .................. G06F 12/0284; G06F 2212/254
See application file for complete search history.

(56) References Cited

U.S. PATENT DOCUMENTS

| 2019/0073301 A1* | 3/2019 | Anderson | ........... G06F 12/0895 |
| 2020/0293447 A1* | 9/2020 | Gupta | ................. G06F 12/0868 |

* cited by examiner

*Primary Examiner* — Gurtej Bansal
(74) *Attorney, Agent, or Firm* — Anderson Gorecki LLP

(57) ABSTRACT

A storage system includes storage resources, front-end devices, and back-end devices that are subdivided into allocation units. Each front-end device has a plurality of tracks, which map to entries in the allocation units. Front-end metadata is used to specify, for a respective track, a respective back-end device, an allocation unit within the respective back-end device, and an entry within the respective allocation unit where the data for the respective track is stored. Back-end metadata is used to specify, for a respective back-end entry, a respective location in the storage resources of the storage system where the data for the respective track is stored and a size of the data on the storage resources. The back-end metadata is organized using shared back-end metadata memory pages, in which each page of metadata is equally shared between two or more of the allocation units.

20 Claims, 11 Drawing Sheets

FIG. 7

| Metadata page 0 | | | |
|---|---|---|---|
| AU:0 E:0 | . | . | . |
| E:1 | . | . | . |
| E:2 | . | . | . |
| . | . | . | AU:0 E:255 |

| Metadata page 1 | | | |
|---|---|---|---|
| AU:0 E:256 | . | . | empty |
| E:257 | . | . | empty |
| E:258 | . | AU:0 E:299 | empty |
| . | . | empty | empty |
| . | . | empty | empty |

| Metadata page 2 | | | |
|---|---|---|---|
| empty | empty | empty | empty |
| empty | empty | empty | empty |
| empty | empty | empty | empty |
| empty | empty | empty | empty |
| empty | empty | empty | empty |

| Metadata page 3 | | | |
|---|---|---|---|
| empty | empty | empty | empty |
| empty | empty | empty | empty |
| empty | empty | empty | empty |
| empty | empty | empty | empty |
| empty | empty | empty | empty |

FIG. 9

| Metadata page 0 | | | | |
|---|---|---|---|---|
| AU:0 E:0 | | . | . | . |
| E:1 | | . | . | . |
| E:2 | | . | . | . |
| . | | . | . | . |
| . | | . | . | AU:0 E:255 |

| Metadata page 1 | | | | |
|---|---|---|---|---|
| AU:0 E:256 | | . | . | . |
| E:257 | | . | AU:0 E:299 | E2 |
| E:258 | | . | AU:1 E:0 | . |
| . | | . | E1 | . |
| . | | . | . | AU:1 E:209 |

| Metadata page 2 | | | | |
|---|---|---|---|---|
| AU:1 E210 | AU:1 E239 | AU:2 E:0 | . | . |
| E211 | | . | . | . |
| E212 | | . | . | . |
| . | | . | . | . |
| . | | . | . | AU:2 E255 |

| Metadata page 3 | | | | |
|---|---|---|---|---|
| AU:2 E256 | | . | . | . |
| . | | . | AU:2 E:359 | . |
| . | | . | AU:3 E:0 | . |
| . | | . | . | . |
| . | | . | . | . |

FIG. 11

| Metadata Page 0 | | | |
|---|---|---|---|
| L-ID:0 | L-ID:1 | L-ID:2 | L-ID:3 |
| AU:0 | AU:1 | AU:2 | AU:3 |
| E:1 | E:1 | E:1 | E:1 |
| E:2 | E:2 | E:2 | E:2 |
| . | . | . | . |
| E:59 | E:59 | E:59 | E:59 |

| Metadata Page 1 | | | |
|---|---|---|---|
| L-ID:4 | L-ID:5 | L-ID:6 | L-ID:7 |
| AU:4 | AU:5 | AU:6 | AU:7 |
| E:1 | E:1 | E:1 | E:1 |
| E:2 | E:2 | E:2 | E:2 |
| . | . | . | . |
| E:59 | E:59 | E:59 | E:59 |

| Metadata Page 2 | | | |
|---|---|---|---|
| L-ID:8 | L-ID:9 | L-ID:10 | L-ID:11 |
| AU:0 | AU:1 | AU:2 | AU:3 |
| E:60 | E:60 | E:60 | E:60 |
| E:61 | E:61 | E:61 | E:61 |
| . | . | . | . |
| E:119 | E:119 | E:119 | E:119 |

| Metadata Page 3 | | | |
|---|---|---|---|
| L-ID:12 | L-ID:13 | L-ID:14 | L-ID:15 |
| AU:4 | AU:5 | AU:6 | AU:7 |
| E:60 | E:60 | E:60 | E:60 |
| E:61 | E:61 | E:61 | E:61 |
| . | . | . | . |
| E:119 | E:119 | E:119 | E:119 |

| Metadata Page 4 | | | |
|---|---|---|---|
| L-ID:16 | L-ID:17 | L-ID:18 | L-ID:19 |
| AU:0 | AU:1 | AU:2 | AU:3 |
| E:120 | E:120 | E:120 | E:120 |
| E:121 | E:121 | E:121 | E:121 |
| . | . | . | . |
| E:179 | E:179 | E:179 | E:179 |

| Metadata Page 5 | | | |
|---|---|---|---|
| L-ID:20 | L-ID:21 | L-ID:22 | L-ID:23 |
| AU:4 | AU:5 | AU:6 | AU:7 |
| E:120 | E:120 | E:120 | E:120 |
| E:121 | E:121 | E:121 | E:121 |
| . | . | . | . |
| E:179 | E:179 | E:179 | E:179 |

| Metadata Page 6 | | | |
|---|---|---|---|
| L-ID:24 | L-ID:25 | L-ID:26 | L-ID:27 |
| AU:0 | AU:1 | AU:2 | AU:3 |
| E:180 | E:180 | E:180 | E:180 |
| E:181 | E:181 | E:181 | E:181 |
| . | . | . | . |
| E:239 | E:239 | E:239 | E:239 |

| Metadata Page 7 | | | |
|---|---|---|---|
| L-ID:28 | L-ID:29 | L-ID:30 | L-ID:31 |
| AU:4 | AU:5 | AU:6 | AU:7 |
| E:180 | E:180 | E:180 | E:180 |
| E:181 | E:181 | E:181 | E:181 |
| . | . | . | . |
| E:239 | E:239 | E:239 | E:239 |

DIRECT ADDRESSING AND EFFICIENT STORAGE OF VARIABLE SIZED METADATA

FIELD

This disclosure relates to computing systems and related devices and methods, and, more particularly, to a direct addressing and efficient storage of variable sized metadata per back-end device disk allocation unit.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a method of organizing back-end metadata is provided that enables metadata pages to be equally shared by multiple back-end device allocation units. By enabling a set of metadata pages to be equally shared by multiple allocation units, it is possible to store metadata with minimal wasted space, while providing the ability to have the metadata directly addressed, thus reducing the number of memory access operations required to access the back-end metadata entries to determine associated storage locations where data is stored in physical storage resources.

According to some embodiments, a storage system includes storage resources, a plurality of front-end devices, each front-end device having a plurality of tracks configured to be accessed by a host to provide the host with access to the storage resources of the storage system, and a plurality of back-end devices, each back-end device having a plurality of allocation units, and each allocation unit having a plurality of entries for storing data from the host. A first memory contains front-end metadata, each piece of front-end metadata specifying, for a respective track, a respective back-end device, an allocation unit within the respective back-end device, and an entry within the respective allocation unit where the data for the respective track is stored. A second memory contains back-end device metadata, each piece of back-end device metadata specifying, for a respective entry, a respective location in the storage resources of the storage system where the data for the respective track is stored and a size of the data on the storage resources. In some embodiments, the second memory is organized using back-end metadata memory pages that are equally shared between sets of the allocation units.

In some embodiments, the plurality of front-end devices are first logical devices, the plurality of back-end devices are second logical devices, and the storage resources of the storage system are physical storage resources.

In some embodiments, each back-end metadata memory page contains a fixed number of entries for each allocation unit of a particular set of allocation units.

In some embodiments, each set of allocation units has two or more allocation units, and each back-end metadata memory page is equally shared by a same number of allocation units.

In some embodiments, each entry of each allocation unit corresponds to a respective track of a respective front-end device.

In some embodiments, the storage system further includes a data reduction system configured to receive host data written by hosts to the tracks of the front-end devices and reduce a size of the host data prior to storing the host data in the storage resources. In some embodiments, each allocation unit has a fixed size, each allocation unit has a variable number of entries, and the number of entries of a given allocation unit is dependent on the reduced size of the host data.

In some embodiments, the back-end device metadata for a given front-end track is directly addressable using a back-end device ID, an allocation unit ID, and an entry number corresponding to the front-end track.

In some embodiments, a memory address for a given allocation unit ID and entry ID is able to be determined by adding a page offset with an entry offset.

In some embodiments, the page offset is able to be determined from an AU lookup ID divided by the number of allocation units that share a particular shared metadata page times the memory page size, plus the AU lookup ID modulo the number of allocation units that share a particular shared page times the total amount of metadata memory allocated to each allocation unit in each memory page, in which the AU lookup ID is calculated by dividing the entry number by the number of entries stored by each metadata page for each allocation unit times the total number of allocation units of the back-end device plus the allocation unit ID.

In some embodiments, a data management system for a storage system, includes a plurality of front-end devices, each front-end device having a plurality of tracks configured to be accessed by a host to provide the host with access to the storage resources of the storage system, and a plurality of back-end devices, each back-end device having a plurality of allocation units, and each allocation unit having a plurality of entries for storing data from the host. The data management system also includes a first memory containing front-end metadata, each piece of front-end metadata specifying, for a respective track, a respective back-end device, an allocation unit within the respective back-end device, and an entry within the respective allocation unit where the data for the respective track is stored, and a second memory containing back-end device metadata, each piece of back-end device metadata specifying, for a respective entry, a respective location in the storage resources of the storage system where the data for the respective track is stored and a size of the data on storage resources of the storage system. The data management system also includes one or more processors and one or more storage devices storing instructions that are operable, when executed by the one or more processors, to cause the one or more processors to perform operations including organizing the second memory using back-end metadata memory pages that are equally shared between sets of the allocation units, and directly addressing entries of back-end device metadata in the equally shared back-end metadata memory pages based on a back-end device ID, allocation unit ID, and entry ID.

In some embodiments, directly addressing entries of back-end metadata includes determining a page offset for a given entry, and an entry offset for the given entry, and adding the page offset and the entry offset.

In some embodiments, determining the page offset includes calculating an AU lookup ID by dividing the entry number of the given entry by the number of entries stored by each metadata page for each allocation unit, times the total number of allocation units of the back-end device, and adding the allocation unit ID, calculating a first memory value by dividing an AU lookup ID by a number of allocation units that share a particular shared metadata page times the memory page size, calculating a second memory value from the AU lookup ID modulo the number of allocation units that share a particular shared page, times the total amount of metadata memory allocated to each allocation unit in each memory page, and adding the first memory value and the second memory value.

In some embodiments, determining the entry offset includes determining a number of entries between the page offset and the given entry, and multiplying the number of entries between the page offset and the given entry times a size of each metadata entry.

In some embodiments, the plurality of front-end devices are first logical devices, the plurality of back-end devices are second logical devices, and the storage resources of the storage system are physical storage resources.

In some embodiments, each back-end metadata memory page contains a fixed number of entries for each allocation unit of a particular set of allocation units.

In some embodiments, each set of allocation units has two or more allocation units, and each back-end metadata memory page is equally shared by a same number of allocation units.

In some embodiments, each entry of each allocation unit corresponds to a respective track of a respective front-end device.

In some embodiments, the data management system further includes a data reduction system configured to receive host data written by hosts to the tracks of the front-end devices and reduce a size of the host data prior to storing the host data in the storage resources. In some embodiments, each allocation unit has a fixed size, each allocation unit has a variable number of entries, and the number of entries of a given allocation unit is dependent on the reduced size of the host data.

BRIEF DESCRIPTION OF THE DRAWINGS

FIG. 7 shows a set of metadata pages allocated to implement the example metadata management option of FIG. 6, in which a fixed amount of memory is allocated to each back-end device allocation unit.

FIG. 9 shows a set of metadata pages allocated to implement the example metadata management option of FIG. 8, in which metadata pages are sequentially shared by back-end device allocation units.

FIG. 11 shows a set of metadata pages allocated to implement the example metadata management option of FIG. 10, in which metadata pages are equally shared by back-end device allocation units, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
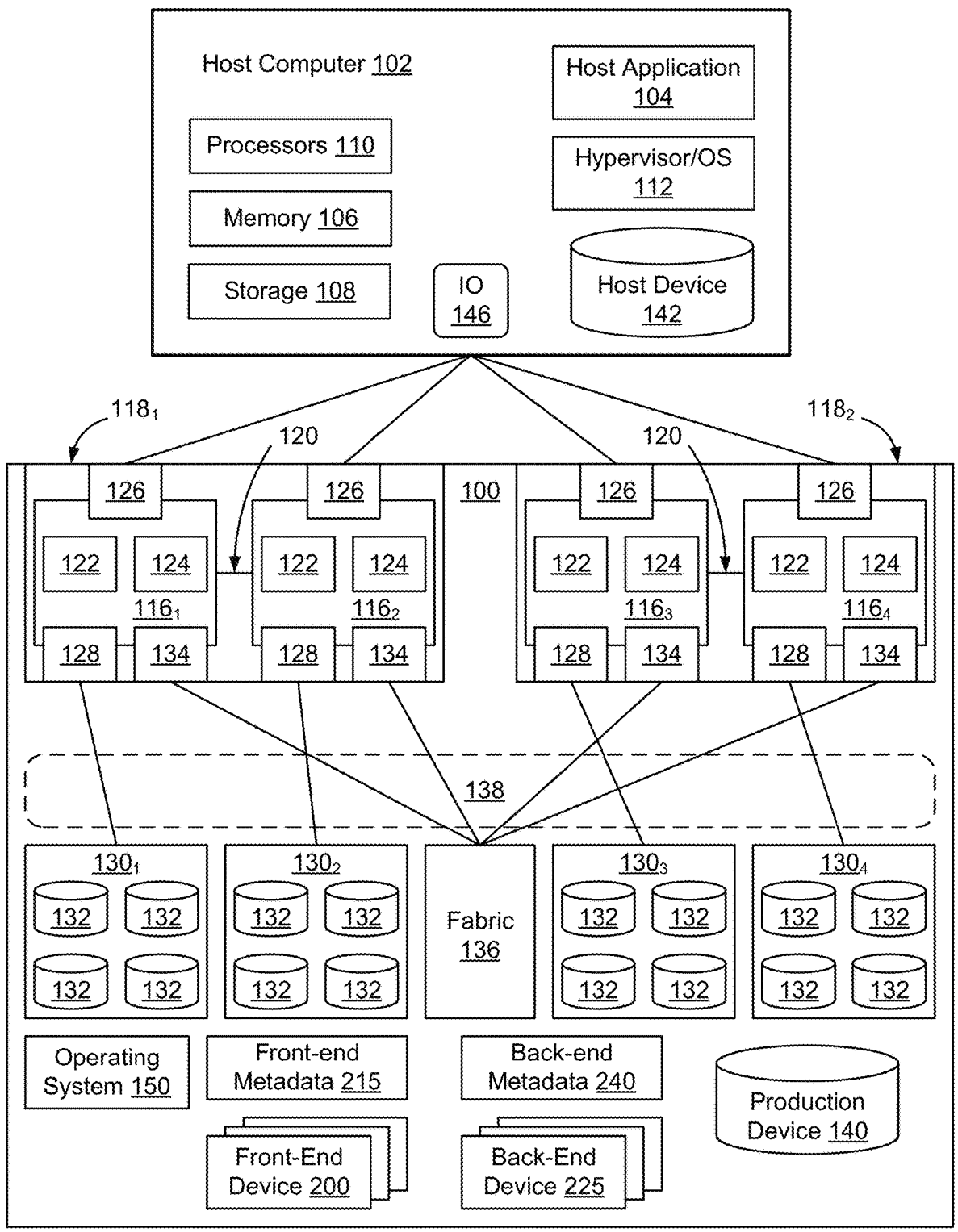
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System)

112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

Figure 2:
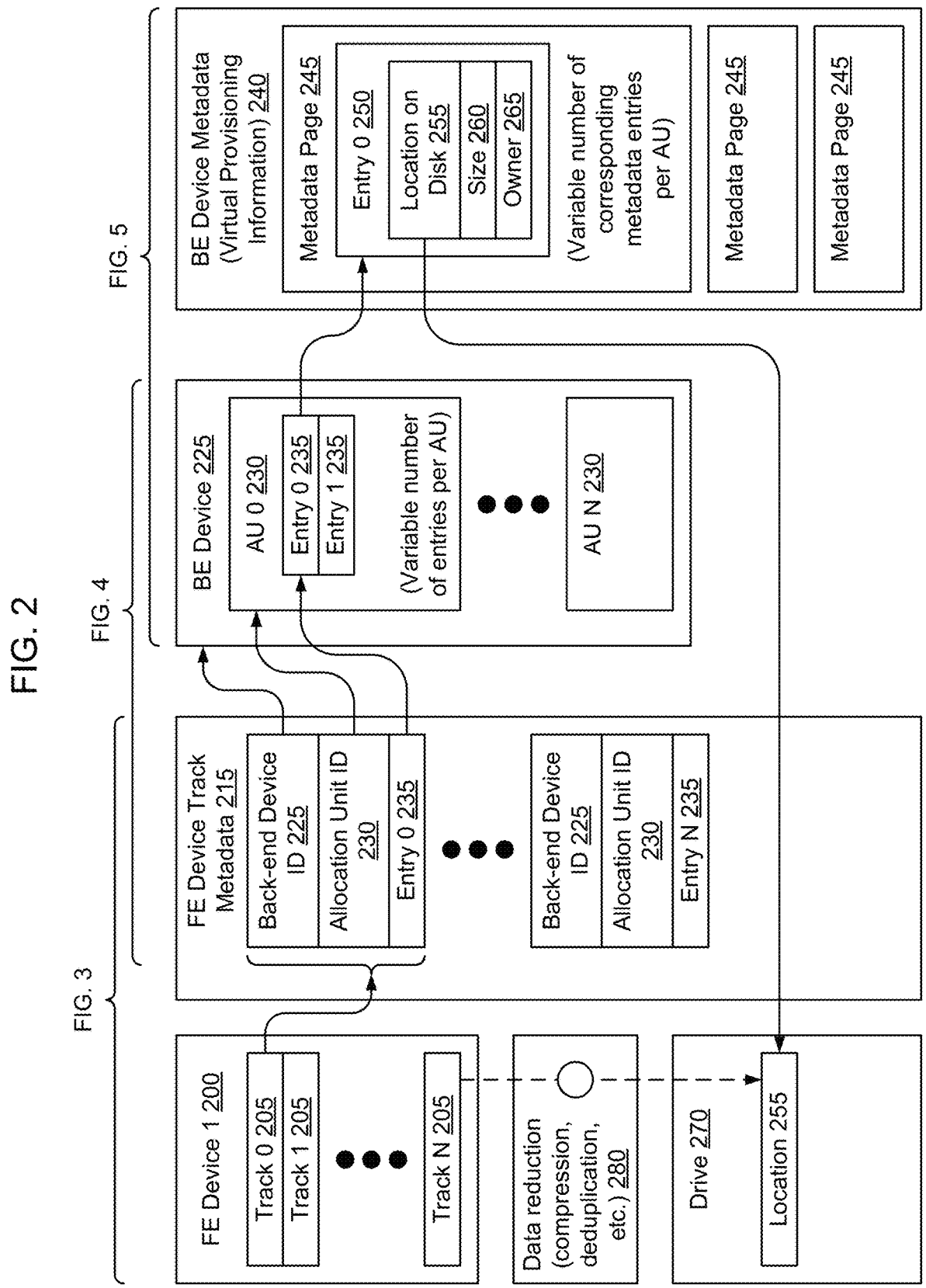
FIG. 2 is a block diagram of an example data management system including front-end storage devices, front-end metadata, back-end devices, back-end metadata, and back-end storage, according to some embodiments.

When a host writes data to a logical device, such as to host device 142, the data that is written by the host is received by the storage system 100 and written to back-end storage resources 132. The storage system keeps track of the host data using a data management system, that enables the storage system to know where each piece of host data is physically stored within the storage system 100. FIG. 2 is a block diagram of an example data management system configured to include front-end storage devices 200, front-end metadata 215, back-end devices 225, back-end metadata 240, and back-end storage 270, according to some embodiments. The front-end devices 200 and back-end devices 225 are abstractions between the host 102 and back-end storage 132, while front-end metadata 215 and back-end metadata 240 enable the storage system to keep track of where each piece of host data is located.

As shown in FIG. 2, in some embodiments the storage system presents a set of front-end devices 200 that are used by hosts to write data to the storage system. A front-end device is also referred to herein as a Thin Device (TDev). Hosts write to tracks 205 of the front-end device 200, which may have a fixed size. An example size of track 205 may be 128 KBs, although other track sizes may be used as well depending on the implementation.

When a host writes data to a track, the track is a logical construct presented to the host 102. Data that is written to the track is stored at a location 255 in drive 270 of back-end storage resources 132. The host data that is stored in track 205 may not fill the entire track (may not be a full 128 KB), and optionally may be subject to data reduction 280, such as compression or deduplication, prior to being stored in back-end storage resources. Accordingly, the actual amount of disk space used to store track 205 may be significantly less than the size of the track 205.

Figure 3:
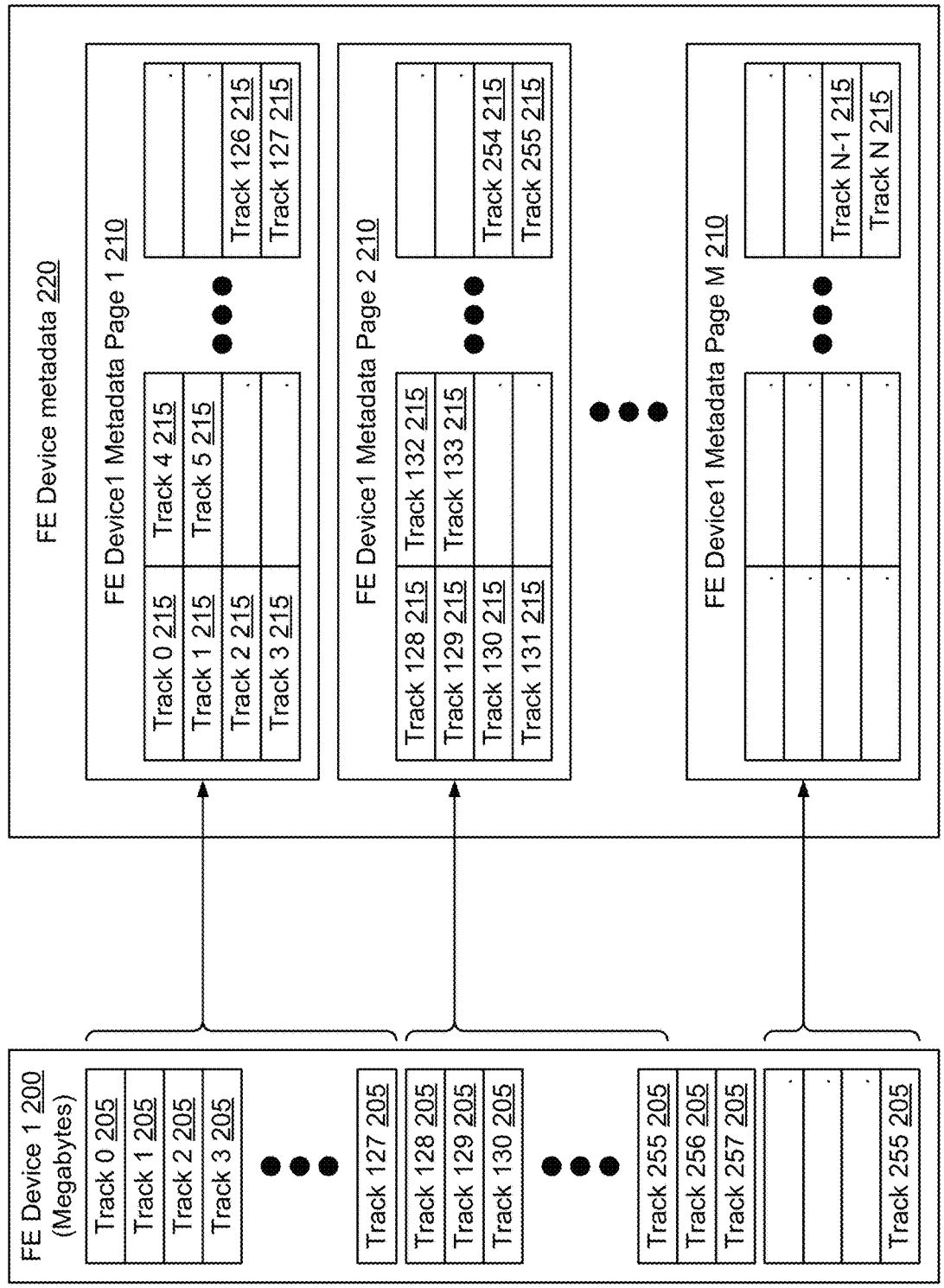
FIG. 3 is a block diagram of a portion of the example data management system of FIG. 2, showing the relationship between an example front-end storage device and front-end metadata for the front-end device, according to some embodiments.

FIG. 3 is a block diagram of a portion of the example data management system of FIG. 2, showing the relationship between an example front-end storage device 200 and front-end metadata 220 for the front-end device, according to some embodiments. As shown in FIG. 3, in some embodiments each front-end device 200 has a set of tracks 205. Front-end metadata 220 includes a set of metadata pages 210 for each front-end device. Each metadata page 210 includes a corresponding front-end track metadata entry 215 for the corresponding front-end track 205. In some embodiments the front-end metadata for each track identifies a corresponding back-end device 225, an allocation unit 230 within the back-end device, and an entry number 235 within the allocation unit where the track is stored.

Figure 4:
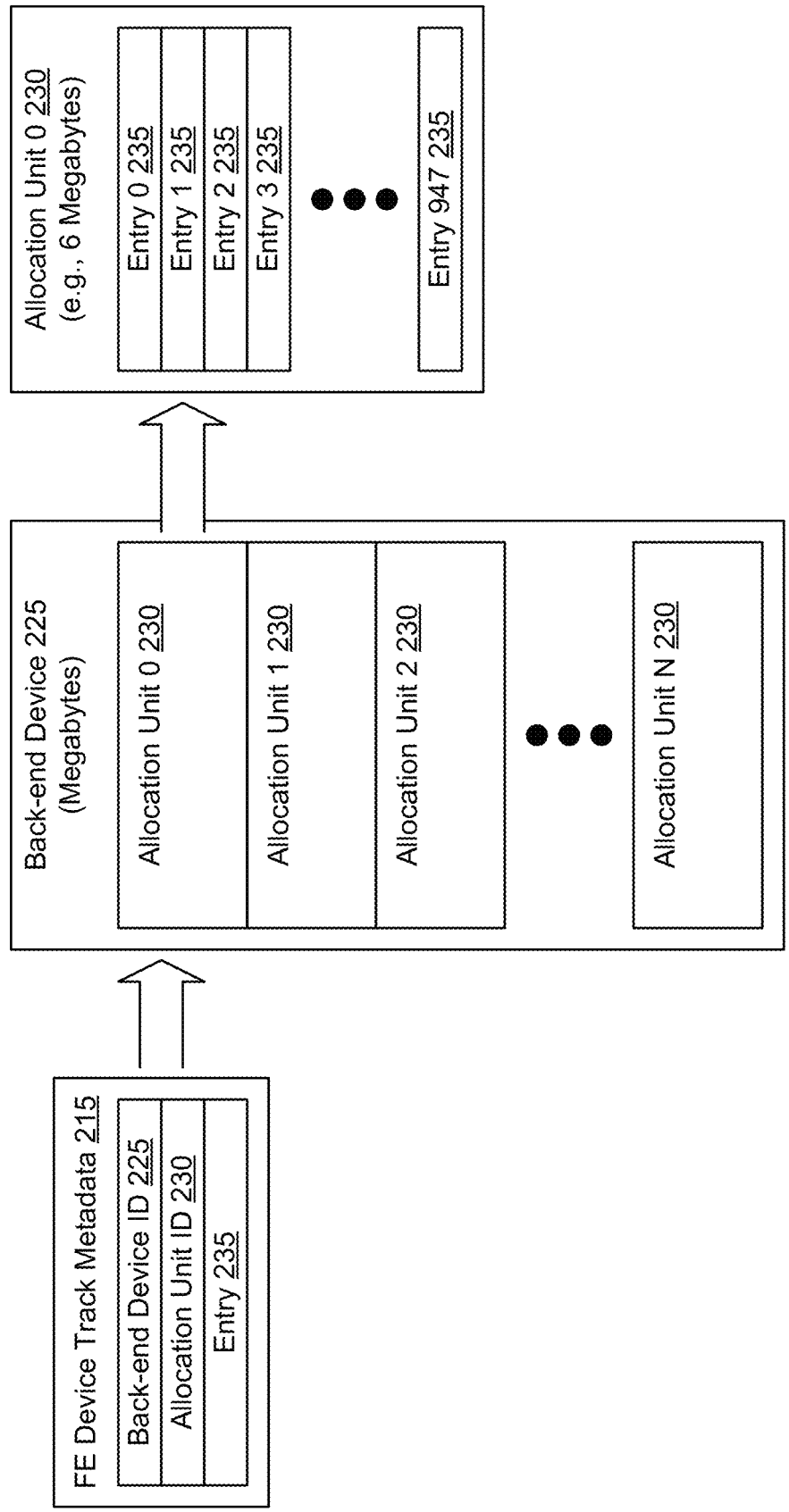
FIG. 4 is a block diagram of a portion of the example data management system of FIG. 2, showing the relationship between example front-end metadata and an example back-end device, according to some embodiments.

FIG. 4 is a block diagram of a portion of the example data management system of FIG. 2, showing the relationship between example front-end metadata 215 and an example back-end device 240, according to some embodiments. As shown in FIG. 4, in some embodiments, the storage engine implements a set of back-end devices 225, also referred to herein as data devices (TDAT), to create back-end storage allocations in connection with writing data to disk 270. In some embodiments, each front-end track metadata entry 215 contains the back-end device ID of the back-end device 225 that is being used to store the data of the track, an allocation unit ID 230 specifying the allocation unit 23 within the back-end device 235 where the data is located, and an entry 235 within the allocation unit 230 where the data is provisioned within the allocation unit.

For example, in some embodiments each back-end device is broken into a set of allocation units 230, each of which has a fixed size. In some embodiments, the allocation units 230 have a size of 6 MB, although other sized allocation units may be used as well. Each allocation unit 230 of each back-end device 225 has a plurality of entries 235, and each respective entry corresponds to a respective one of the front-end tracks 205. In some embodiments, the allocation units have a maximum number of entries that is set at a predefined number. For example, in some embodiments an allocation unit 230 may have a maximum of 948 entries, although the particular maximum number of entries per allocation unit may vary depending on the implementation.

Figure 5:
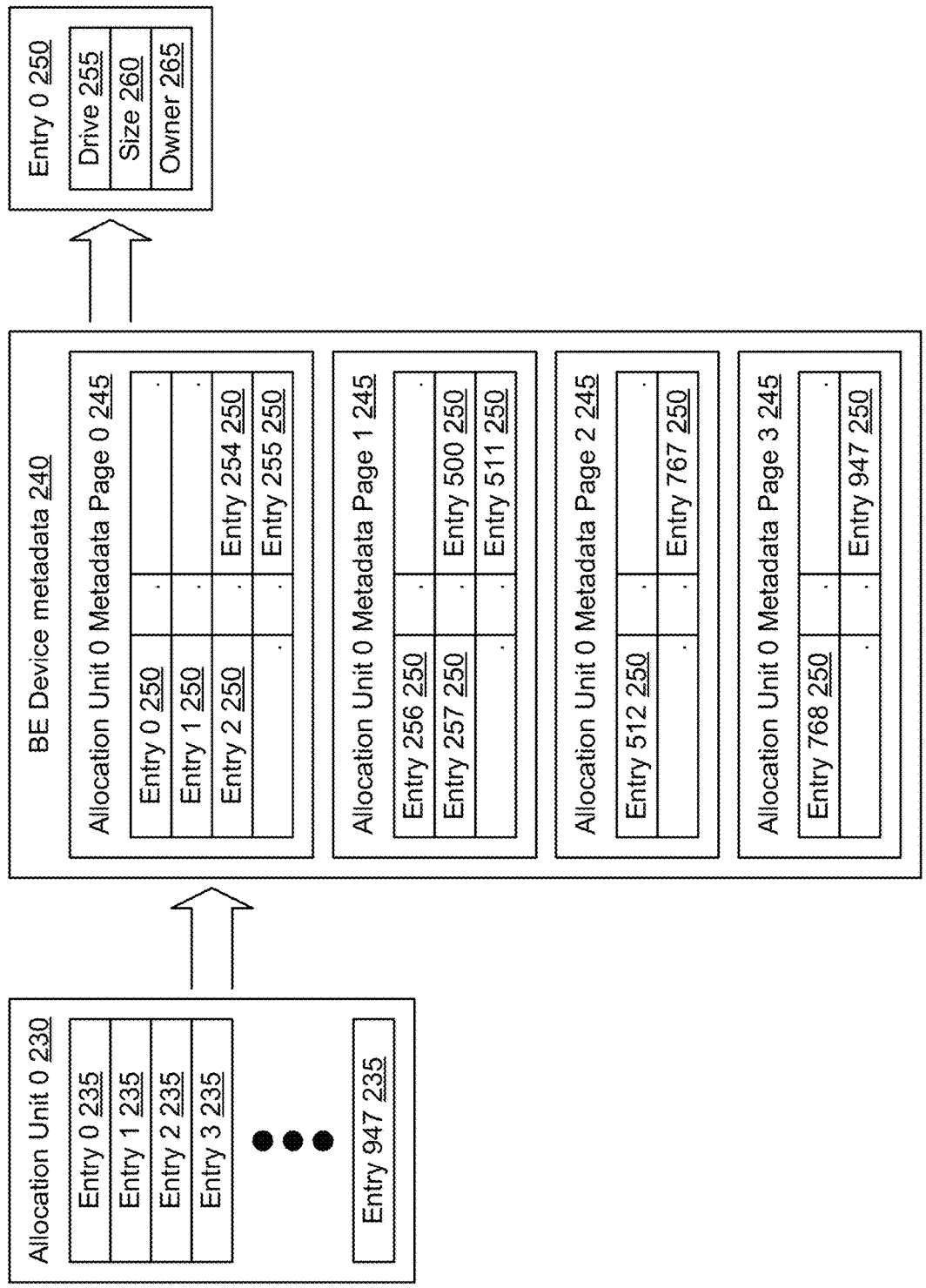
FIG. 5 is a block diagram of a portion of the example data management system of FIG. 2, showing the relationship between a portion (allocation unit) of a back-end device and example back-end device metadata, according to some embodiments.

FIG. 5 is a block diagram of a portion of the example data management system of FIG. 2, showing the relationship between a portion (allocation unit) of a back-end device and example back-end device metadata, according to some embodiments. As shown in FIG. 5, each allocation unit 230 has a variable number of entries 235. In some embodiments, the number of entries 235 contained in an allocation unit 230 may vary between 1 and a maximum number (e.g., 948 entries), although the particular maximum number of entries allowed to be included in a given allocation unit will depend on the particular implementation.

Each entry 235 in a given allocation unit 230 has a corresponding metadata entry 250 in back-end device metadata 240. The metadata entry 250 in back-end device metadata 240 in some embodiments includes virtual provisioning information configured to identify the location of the data in the drives 270 where the data is stored. In some embodiments, the back-end metadata entry 250 includes the location on disk 255, the size of the data 260, and the owner of the data 265, although other metadata fields may be included depending on the implementation. In some embodiments, each back-end metadata entry 250 has a fixed length such as sixteen bytes, although the particular size of each back-end metadata entry will depend on the implementation. The size of the back-end metadata entry 250 is fixed and is independent of the compressibility of the data. Data that compresses to 1 KB requires the same size allocation of back-end metadata as data that doesn't compress at all.

As noted above, in some embodiments the data that is stored in front-end tracks 205 may be reduced 280 prior to being stored in back-end storage resources 270. Accordingly, the number of entries 235 of each allocation unit 230 may vary depending on the compressibility or reducibility of the host data. For example, if an allocation unit has a size of 6 MB, and each track 205 of host data that is mapped to the allocation unit is able to be compressed to 8 KB, the 6 MB allocation unit will be able to store on the order of 750 entries. By contrast, if each track that is mapped to the allocation unit is only able to compress down to 32 KB, the same 6 MB allocation unit would only have approximately 190 entries. Since each entry 235 requires a corresponding entry 250 in back-end metadata 240, and each metadata entry 250 is the same size, the amount of back-end metadata 240 space required to be used to store metadata for each of the allocation units 230 can vary greatly.

According to some embodiments, a method for organizing back-end metadata is provided that enables metadata pages to be equally shared by multiple allocation units 230 of a given back-end device 225. By enabling a set of metadata pages to be equally shared by multiple allocation units 230 of a given back-end device 225, it is possible to store metadata with minimal wasted space, while providing the ability to have the metadata directly addressed, thus reducing the number of memory access operations required to access the back-end metadata entries 250.

In some embodiments, back-end device metadata 240 is organized using back-end device metadata pages 245. As an example, a given metadata page 245 may be implemented as a 4 KB page of memory. In embodiments where each back-end device metadata entry is 16 KB, each metadata page 245 may contain up to 256 metadata entries 250. Although some embodiments are described in which the size of the metadata pages 245 is assumed to be 4 KB, it should be understood that the particular size of the metadata pages may vary depending on the implementation. For example, the size of the metadata pages may be 2 KB, 4 KB, 8 KB, or another size depending on the particular implementation.

In an environment where the number of entries 235 contained by the allocation units 230 can vary greatly, it can become challenging to efficiently allocate storage to maintain the back-end device metadata 240. According to some embodiments, a method and apparatus for allocating memory to back-end device metadata 240 is provided, which efficiently allocates memory with minimal wasted memory allocations, while accommodating a varying number of entries 235 per allocation unit 230, and minimizing the number of memory accesses required to read or write the back-end metadata to the allocated storage. Specifically, in some embodiments the allocations are organized to enable a direct lookup of a given back-end device metadata entry using the combination of a back-end device ID, allocation unit ID, and entry number, without requiring a separate memory access to determine an offset value for the start of the allocation unit metadata.

Figure 6:
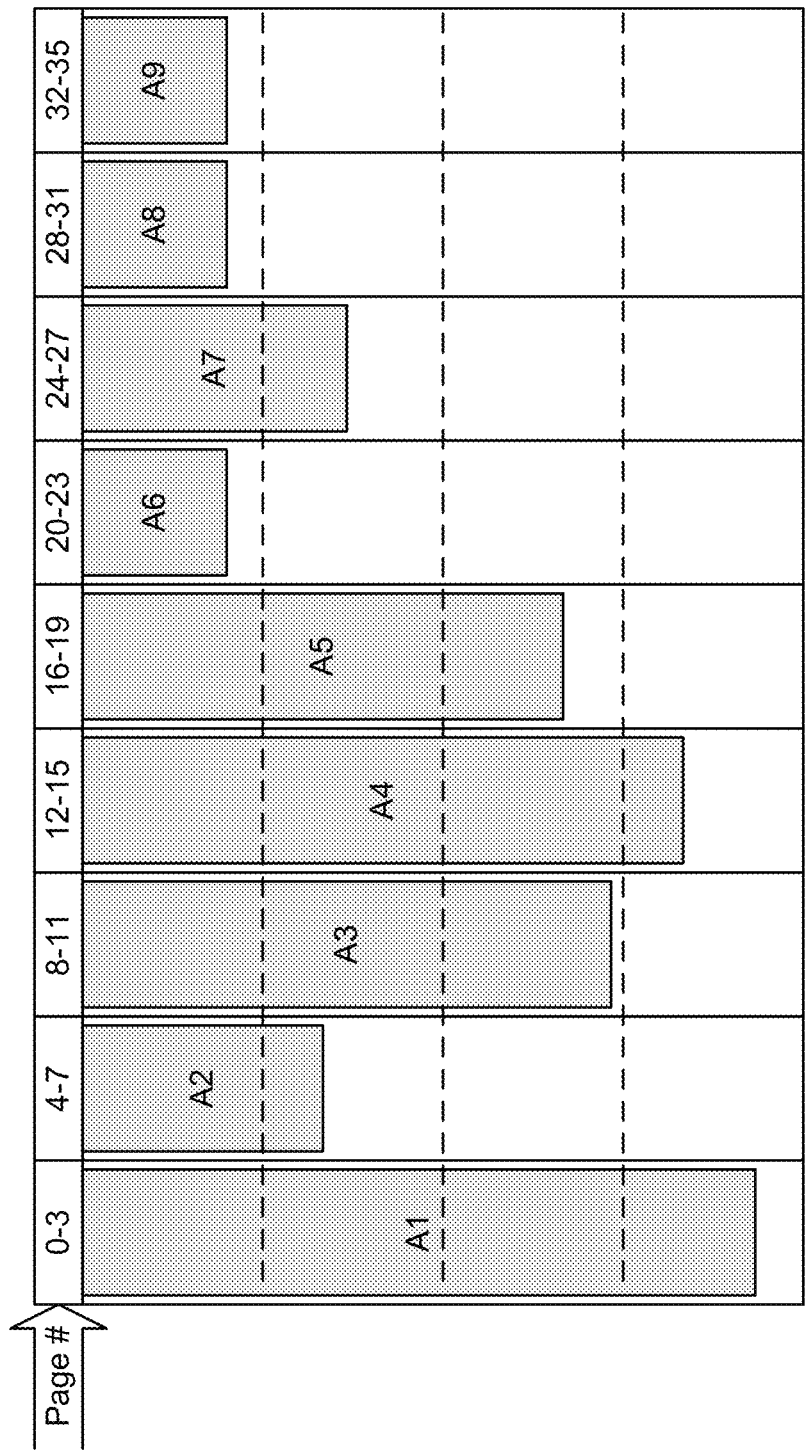
FIG. 6 is a block diagram of an example metadata management option in which a fixed amount of memory is allocated to each back-end device allocation unit.

FIG. 6 is a block diagram of an example metadata management option in which a fixed amount of memory (fixed number of memory pages) is allocated to each back-end device allocation unit, regardless of the number of entries in the allocation unit. As shown in FIG. 6, one way to manage back-end metadata would be to assign a fixed amount of metadata memory (fixed number of memory pages) to each allocation unit. As shown in FIG. 6, if sufficient metadata space is allocated to enable each allocation unit 230 to have up to 948 entries 235, each entry 235 is sixteen bytes, and each metadata page has a size of 4 KB (4096 bytes), each allocation unit will need to be allocated at least four 4 KB memory pages to ensure that there is sufficient space in memory to store all of the required metadata entries. This approach satisfies the memory access requirement, since the array can calculate the metadata location for a given BE device ID/allocation unit ID/entry ID, since the metadata size for each allocation unit is fixed. However, this also means that the storage system is provisioning metadata without considering data compressibility. In instances where the data is not compressible, such that a given allocation unit has a relatively small number of entries, it may be possible to use fewer than four memory pages to store all of the metadata for a given allocation unit. Accordingly, there are instances where allocating four metadata pages to each allocation unit results in a sub-optimal allocation of metadata storage capacity. However, if fewer than four pages of memory are assigned to a given allocation unit, the allocation unit may run out of metadata memory which may prevent the allocation unit from being fully utilized. Specifically, the lack of metadata memory could prevent a portion of the allocation unit from being used, since the maximum number of entries has been reached.

In some embodiments, different allocation units can be used to store entries of different sizes. Thus, for example, a first allocation unit could be used to store entries that compress to 8 KB, while a second allocation unit could be used to store entries that compress to 32 KB. While this allows the storage system to know a maximum number of entries that will be contained in a given allocation unit, and to reduce the amount of metadata memory that is used for allocation units with fewer entries, this results in a situation where the storage system is only able to allocate space from a given allocation unit of back-end device that compresses to a particular level. In an environment where the compressibility of the data is changing, which requires the front-end track 205 to be moved to a new back-end entry, the change in compressibility can result in significant overhead because it requires moving data between back-end devices and reconfiguring them to support different data compressibility sizes.

FIG. 6 is a block diagram of an example metadata management option in which a fixed amount of memory is allocated to each back-end device allocation unit. FIG. 7 shows a set of metadata pages allocated to implement the example metadata management option of FIG. 6, in which a fixed amount of memory is allocated to each back-end device allocation unit. As shown in FIG. 6, if each allocation unit is assigned four pages of metadata memory, each of the allocation units can have a maximum number of entries. However, those allocation units that have a smaller number of entries will have excess assigned metadata memory, which is less than ideal. For example, in FIG. 6 allocation unit A1 has been assigned metadata memory pages 0-3, and has used most of that space. Allocation units A6, A8, and A9 have each been assigned four metadata pages (pages 20-23, 28-31, and 32-35 respectively), but each of these allocation units have fewer entries and, accordingly, could each have been assigned only one metadata page to accommodate the metadata based on the number of entries in these allocation units. As shown in FIG. 7, allocating a fixed number of metadata pages to each allocation unit can result in a situation where one or more of the metadata pages (page 2 and page 3 in this example) contain no metadata, because the allocation unit has a lower number of entries (300 entries in this example) which are able to be maintained using two metadata pages.

It is possible to reduce the amount of metadata memory that is assigned to particular allocation units, for example by restricting the size of the entries of a particular allocation unit. For example, in FIG. 6, if allocation units A6, A8, and A9 are restricted to include entries that are above a particular size, such that the number of entries in those allocation units will never require more than one metadata page, it is possible to not assign metadata pages 21-23, 29-31, and 33-35 to these allocation units, thus saving considerable metadata memory. However, this constrains use of the allocation units, which can result in data entries being moved between allocation units when the compressibility of the data stored in the entries changes.

Figure 8:
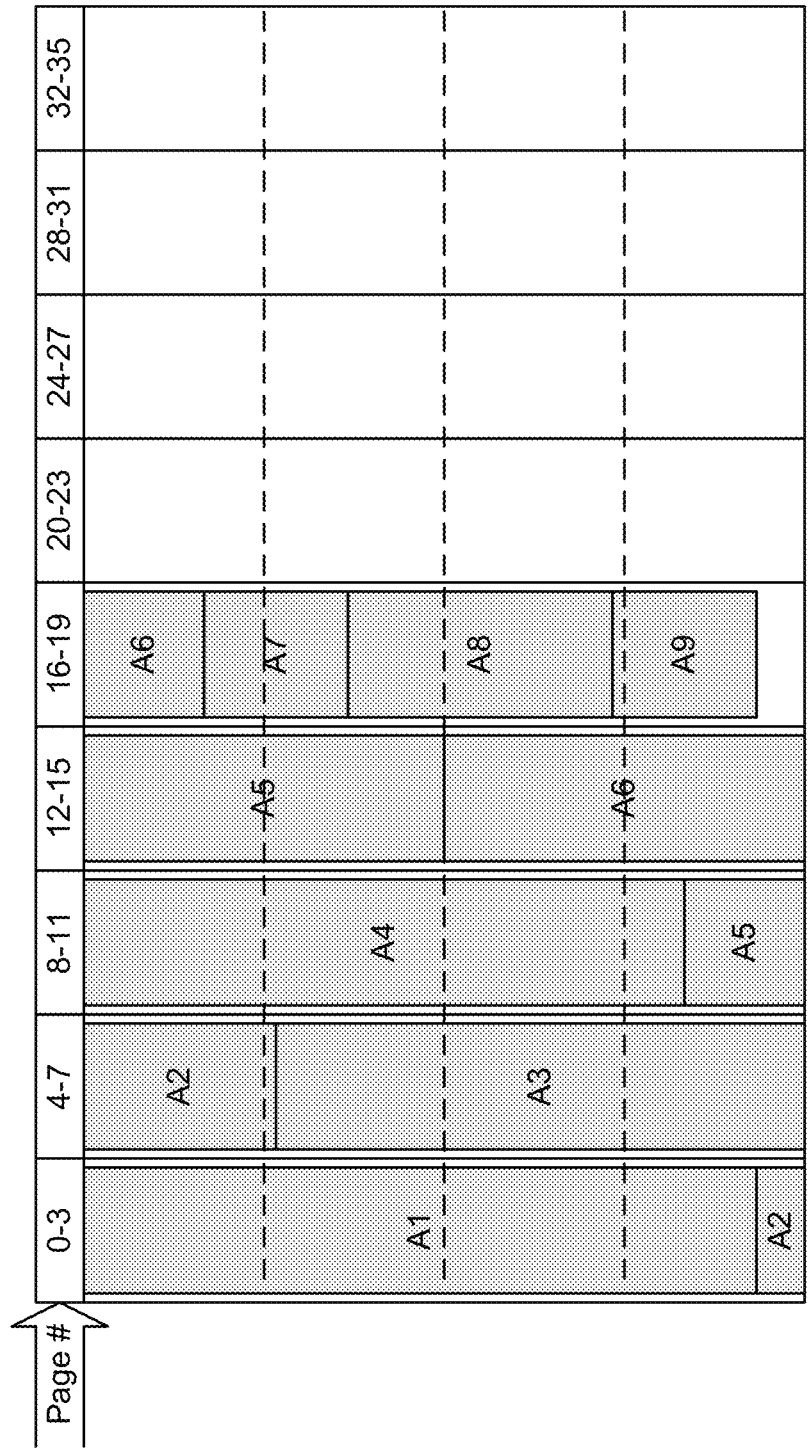
FIG. 8 is a block diagram of an example metadata management option in which metadata pages are sequentially shared by back-end device allocation units.

FIG. 8 is a block diagram of an example metadata management option in which metadata pages are sequentially shared by back-end device allocation units. FIG. 9 shows a set of metadata pages allocated to implement the example metadata management option of FIG. 8, in which metadata pages are sequentially shared by back-end device allocation units. As shown in FIG. 8, it is possible for the allocation units to sequentially share metadata pages, such that a first allocation unit (A1) uses a first set of metadata entries of a metadata page, and then a second allocation unit (A2) also uses metadata entries of the metadata page. Thus, for example as shown in FIG. 9, if the first allocation unit includes 300 entries, the first allocation unit AU:0 will use metadata entries 0-255 of metadata page 0, and metadata entries 256-299 of metadata page 1. If the second allocation unit AU:1 has 240 entries, the second allocation unit will store entries 0-209 in metadata entries 300-511 of metadata page 1, and will store entries 210-239 in metadata entries 0-30 of metadata page 2.

In this manner, the metadata entries of subsequent allocation units can compactly share metadata space of the pages of metadata. This results in very little waste of metadata space, but results in an additional memory access cost. Specifically, it is not possible to directly access a given metadata entry for a given back-end device ID/allocation unit/entry, without first determining an offset value of the allocation unit within the set of metadata memory pages. For example, to determine the location of entry 5 of allocation unit #2, it is first necessary to do a lookup operation to determine the starting location of allocation unit #2 (AU: 2=metadata page 2, location 31 in this example), and then do a second lookup operation based on this offset starting location to read the metadata for entry #5.

Figure 10:
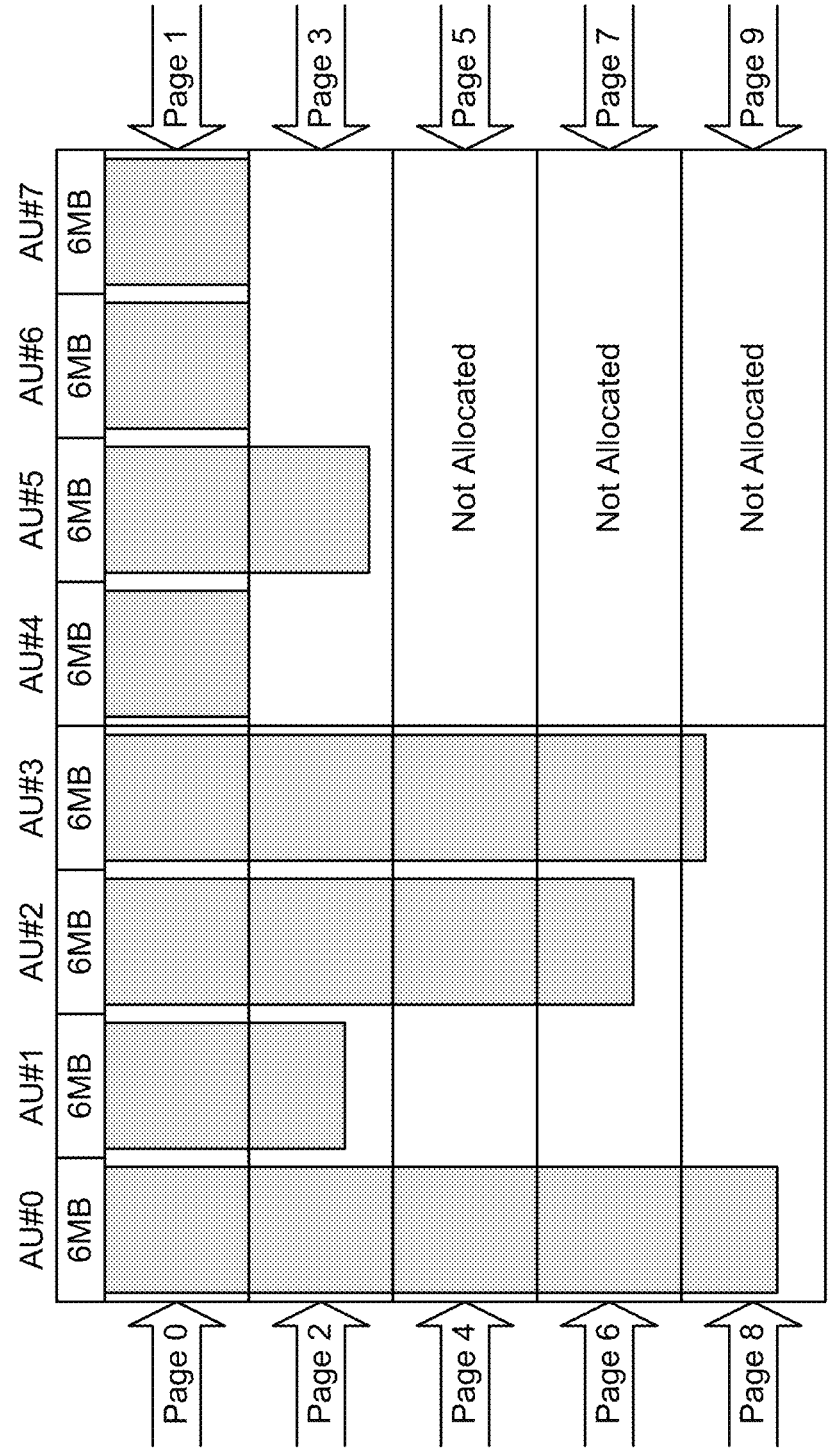
FIG. 10 is a block diagram of an example metadata management option in which metadata pages are equally shared by back-end device allocation units, according to some embodiments.

FIG. 10 is a block diagram of an example metadata management option in which metadata pages are equally shared by back-end device allocation units, according to some embodiments. FIG. 11 shows a set of metadata pages allocated to implement the example metadata management option of FIG. 10, in which metadata pages are equally shared by back-end device allocation units, according to some embodiments. As shown in FIG. 10, in some embodiments the method of enabling equal sharing of metadata pages provides for minimal wasting of metadata storage space, while enabling direct addressing of metadata based on back-end device ID/allocation unit/entry ID, as specified by the storage system's front-end metadata.

As shown in FIG. 10, metadata space is equally shared among multiple allocation units per memory page. This approach makes use of the fixed metadata concept, but is implemented such that it provides the flexibility to incrementally provision smaller units of memory per allocation unit based on demand. By enabling back-end device allocation units to equally share ranges of entries of back-end metadata pages, it is possible to provide flexibility regarding mixing of different data compressibilities in the same allocation unit. Specifically, different allocation units can have different numbers of entries, and the number of entries of a given allocation unit can change over time, while having back-end metadata page allocations dynamically adjust to accommodate the number of entries of any given allocation unit. However, since metadata pages are used by multiple allocation units, it is possible to achieve efficient metadata utilization while still retaining the ability to directly address each metadata entry based on back-end device ID/allocation unit ID/entry #.

According to some embodiments, each allocation unit is provided with a fixed number of entries per memory page. For example, if the memory page has a size of 4 KB (4096 bytes), and each metadata entry is 16 bytes, if the memory page is shared by four allocation units, each allocation unit would be assigned approximately 60 entries. Likewise, if the same 4 KB metadata memory page is shared by five allocation units, each allocation unit would be assigned approximately 50 entries.

For example, as shown in FIG. 11, metadata page 0 is shared by four Allocation Units (AU:0, AU:1, AU:2, and AU:3), and metadata page 1 is shared by four Allocation Units (AU:4, AU:5, AU:6, and AU:7). In this example it is assumed that the back-end device has 8 Allocation Units (AUs), however if a back-end device has more than 8 allocation units then additional metadata pages would be used to maintain sequential regions of entries for each of the additional allocation units (e.g. AU:8-AU:N). Although some embodiments will be described in which each metadata page is shared by four allocation units, it should be understood that each metadata page could be shared by a different number of two or more allocation units, depending on the implementation. Likewise, although some embodiments will be described in which each metadata page has a size of 4 KB, it should be understood that other metadata page sizes may be used depending on the implementation. As used herein, the term "shared" metadata page is herein defined to refer to a particular page of metadata memory that is assigned to be used by two or more allocation units. A metadata page that is used by only one allocation unit is a "dedicated" metadata page and is not a "shared" metadata page, as that term is used herein.

Each shared metadata page contains a range of entries for each of its set of allocation units. For example, in FIG. 11, shared metadata pages 0 and 1 both include 60 entries for each of the set of sequential allocation units. Thus, for example, shared metadata page 0 contains entries E:0-E:59 for AU:0, entries E:0-E:59 for AU:1, entries E:0-E:59 for AU:2, and entries E:0-E:59 for AU:3. Similarly, shared metadata page 1 contains entries E:0-E:59 for AU:4, entries E:0-E:59 for AU:5, entries E:0-E:59 for AU:6, and entries E:0-E:59 for AU:7. The next set of shared memory pages (metadata page 2 and metadata page 3) contain entries E:60-E:119 for each of the set of sequential allocation units. Thus, for example, shared metadata page 2 contains entries E:60-E:119 for AU:0, entries E:60-E:119 for AU:1, entries E:60-E:119 for AU:2, and entries E:60-E:119 for AU:3. Similarly, shared metadata page 3 contains entries E:60-E: 119 for AU:4, entries E:60-E:119 for AU:5, entries E:60-E: 119 for AU:6, and entries E:60-E:119 for AU:7.

Since each shared metadata page is used to store an equal number of entries for a predefined number of allocation units, and since each metadata page is used to store a particular equal number of entries for each allocation unit, it is possible to directly look up a metadata entry based on the back-end device ID/allocation unit ID/entry #.

According to some embodiments, let:
Device ID=identifier of the back-end device
$AU_{ID}$=Allocation Unit (AU) ID=the allocation unit within the back-end device
Entry #=the entry number to be looked up
$AU_T$=total number of allocation units 230 of the particular back-end device 225
$M_{AU}$=number of allocation units that share a particular shared metadata page
$M_E$=number of entries stored by the shared metadata page for each allocation unit
Then:

AU_lookup_Id=(Entry #/$M_E$*$AU_T$)+$AU_{ID}$

For example, to find the memory page key for Device A/Allocation Unit=3/Entry 120, assuming $AU_T$=8, $M_{AU}$=4, and $M_E$=60:

AU_lookup_ID=((120/60)*8)+3=19

As shown in FIG. 11, AU_lookup_ID:19 appears as the fourth column of entries in metadata page #4.

To find the offset of the start of the AU_lookup_ID in the metadata, e.g., the starting address of the first entry of the set of entries for the determined AU_lookup:ID:

page.offset=[(AU_lookup_ID/$M_{AU}$)*memory page size]+[(AU_lookup_ID % $M_{AU}$)*total metadata size of AU per memory page], where % is a modulo operator that returns the remainder of the division operation when AU_lookup is divided by $M_{AU}$. For example, to find the page.offset for AU_lookup_ID=19, if each metadata memory page has a size of 4 KB (4096 bytes), the number of allocation units with entries in a given metadata page is four ($M_{AU}=4$), and, each shared metadata page stores 60 metadata entries for each of the four allocation units ($M_E=60$), and each metadata entry is 16 bytes, then:

$$page.offset=[(19/4)*4096]+[(19\%4)*(16*60)]$$
$$=16384+2880=19246\ bytes$$

To get the entry offset within the page, the difference between the selected entry and the first entry for the AU_lookup_ID is determined and multiplied times the size of each metadata entry. For example:

$$entry.offset=[Entry\ ID-[Integer(AU\_lookup\_ID/AU_T)*M_E]]*entry\ size$$

For example, to determine the entry offset for entry 125, where each entry is 16 bytes long:

$$entry.offset=[125-(INT(19/8)*60)]*16=[125-(2*60)]*16=5*16=80\ bytes$$

Total.offset, accordingly, is the page.offset plus the entry.offset:

$$total.offset=page.offset+entry.offset$$

In this example:

$$total.offset=19246+80=16464\ bytes$$

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A storage system, comprising:
   storage resources;
   a plurality of front-end devices, each front-end device having a plurality of tracks configured to be accessed by a host to provide the host with access to the storage resources of the storage system;
   a plurality of back-end devices, each back-end device having a plurality of allocation units, and each allocation unit having a plurality of entries for storing data from the host;
   a first memory containing front-end metadata, each piece of front-end metadata specifying, for a respective track, a respective back-end device, an allocation unit within the respective back-end device, and an entry within the respective allocation unit where the data for the respective track is stored; and
   a second memory containing back-end device metadata, each piece of back-end device metadata specifying, for a respective entry, a respective location in the storage resources of the storage system where the data for the respective track is stored and a size of the data on the storage resources;
   wherein the second memory is organized using back-end metadata memory pages that are equally shared between sets of the allocation units.

2. The storage system of claim 1, wherein the plurality of front-end devices are first logical devices, the plurality of back-end devices are second logical devices, and the storage resources of the storage system are physical storage resources.

3. The storage system of claim 1, wherein each back-end metadata memory page contains a fixed number of entries for each allocation unit of a particular set of allocation units.

4. The storage system of claim 1, wherein each set of allocation units has two or more allocation units, and wherein each back-end metadata memory page is equally shared by a same number of allocation units.

5. The storage system of claim 1, wherein each entry of each allocation unit corresponds to a respective track of a respective front-end device.

6. The storage system of claim 1, further comprising a data reduction system configured to receive host data written by hosts to the tracks of the front-end devices and reduce a size of the host data prior to storing the host data in the storage resources.

7. The storage system of claim 6, wherein each allocation unit has a fixed size, wherein each allocation unit has a variable number of entries, and the number of entries of a given allocation unit is dependent on the reduced size of the host data.

8. The storage system of claim 1, wherein the back-end device metadata for a given front-end track is directly addressable using a back-end device ID, an allocation unit ID, and an entry number corresponding to the front-end track.

9. The storage system of claim 8, wherein a memory address for a given allocation unit ID and entry ID is able to be determined by adding a page offset with an entry offset.

10. The storage system of claim 9, wherein the page offset is able to be determined from an AU lookup ID divided by the number of allocation units that share a particular shared metadata page times the memory page size, plus the AU lookup ID modulo the number of allocation units that share a particular shared page times the total amount of metadata memory allocated to each allocation unit in each memory page; and
  wherein the AU lookup ID is calculated by dividing the entry number by the number of entries stored by each metadata page for each allocation unit times the total number of allocation units of the back-end device plus the allocation unit ID.

11. A data management system for a storage system, comprising:
  a plurality of front-end devices, each front-end device having a plurality of tracks configured to be accessed by a host to provide the host with access to the storage resources of the storage system;
  a plurality of back-end devices, each back-end device having a plurality of allocation units, and each allocation unit having a plurality of entries for storing data from the host;
  a first memory containing front-end metadata, each piece of front-end metadata specifying, for a respective track, a respective back-end device, an allocation unit within the respective back-end device, and an entry within the respective allocation unit where the data for the respective track is stored;
  a second memory containing back-end device metadata, each piece of back-end device metadata specifying, for a respective entry, a respective location in the storage resources of the storage system where the data for the respective track is stored and a size of the data on storage resources of the storage system; and
  one or more processors and one or more storage devices storing instructions that are operable, when executed by the one or more processors, to cause the one or more processors to perform operations comprising:
    organizing the second memory using back-end metadata memory pages that are equally shared between sets of the allocation units; and
    directly addressing entries of back-end device metadata in the equally shared back-end metadata memory pages based on a back-end device ID, allocation unit ID, and entry ID.

12. The data management system of claim 11, wherein directly addressing entries of back-end metadata comprises determining a page offset for a given entry, and an entry offset for the given entry, and adding the page offset and the entry offset.

13. The data management system of claim 12, wherein determining the page offset comprises:
  calculating an AU lookup ID by dividing the entry number of the given entry by the number of entries stored by each metadata page for each allocation unit, times the total number of allocation units of the back-end device, and adding the allocation unit ID;
  calculating a first memory value by dividing an AU lookup ID by a number of allocation units that share a particular shared metadata page times the memory page size;
  calculating a second memory value from the AU lookup ID modulo the number of allocation units that share a particular shared page, times the total amount of metadata memory allocated to each allocation unit in each memory page; and
  adding the first memory value and the second memory value.

14. The data management system of claim 12, wherein determining the entry offset comprises determining a number of entries between the page offset and the given entry, and multiplying the number of entries between the page offset and the given entry times a size of each metadata entry.

15. The data management system of claim 11, wherein the plurality of front-end devices are first logical devices, the plurality of back-end devices are second logical devices, and the storage resources of the storage system are physical storage resources.

16. The data management system of claim 11, wherein each back-end metadata memory page contains a fixed number of entries for each allocation unit of a particular set of allocation units.

17. The data management system of claim 11, wherein each set of allocation units has two or more allocation units, and wherein each back-end metadata memory page is equally shared by a same number of allocation units.

18. The data management system of claim 11, wherein each entry of each allocation unit corresponds to a respective track of a respective front-end device.

19. The data management system of claim 11, further comprising a data reduction system configured to receive host data written by hosts to the tracks of the front-end devices and reduce a size of the host data prior to storing the host data in the storage resources.

20. The data management system of claim 19, wherein each allocation unit has a fixed size, wherein each allocation unit has a variable number of entries, and the number of entries of a given allocation unit being dependent on the reduced size of the host data.

* * * * *